April 15, 1930.  D. SANDFORD  1,754,404
OIL PUMPING PREVENTION PISTON MEANS
Filed Feb. 7, 1929
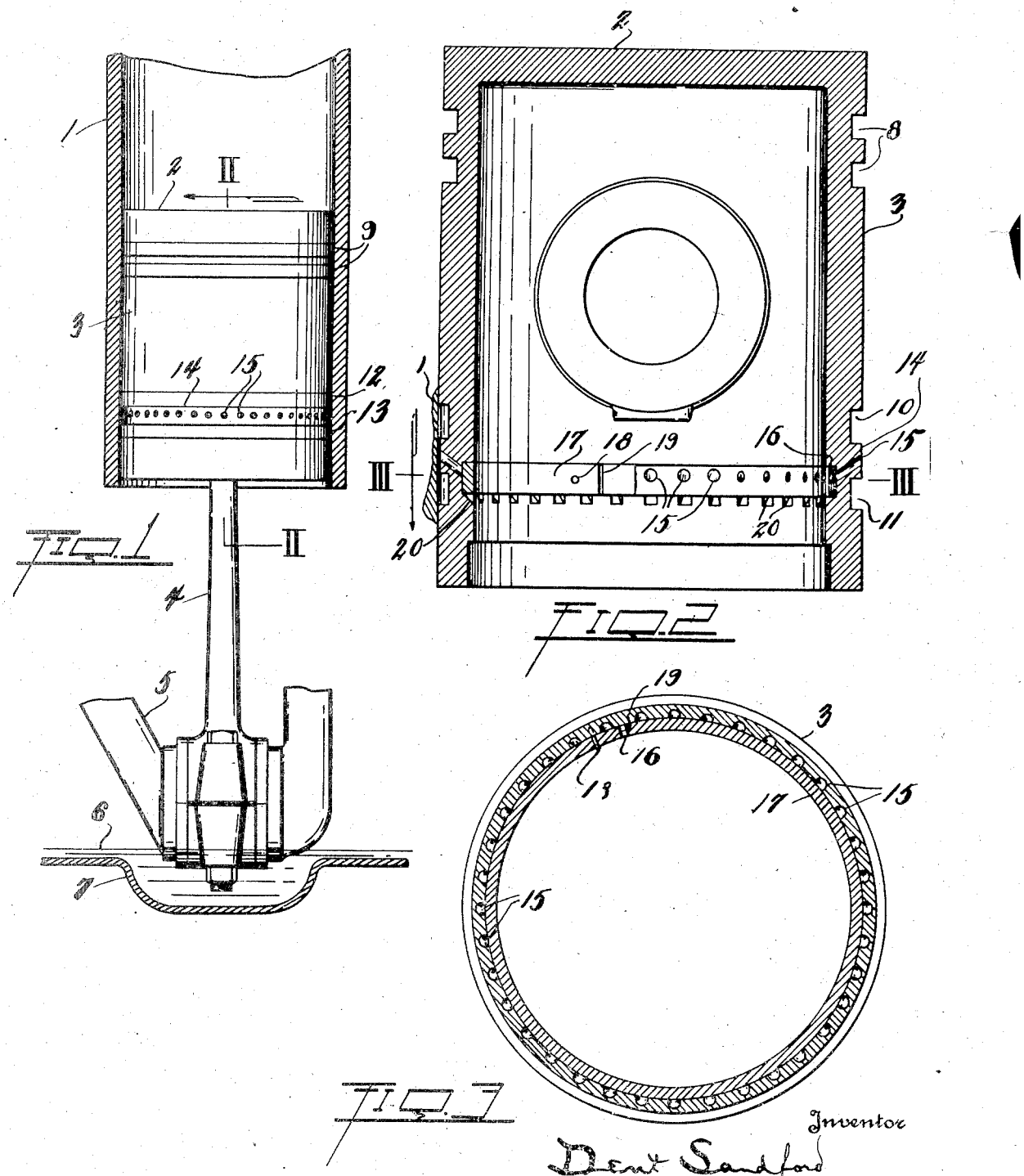

Patented Apr. 15, 1930

1,754,404

UNITED STATES PATENT OFFICE

DENT SANDFORD, OF TOLEDO, OHIO

OIL-PUMPING-PREVENTION PISTON MEANS

Application filed February 7, 1929. Serial No. 338,124.

This invention relates to the promotion of piston effectiveness against pumping of oil.

This invention has utility when incorporated in single acting piston pumps and motors, as an automatic valve against lubricant working past the piston.

Referring to the drawings:

Fig. 1 is a side elevation of an embodiment of the invention in a piston and cylinder device, parts being broken away;

Fig. 2 is an enlarged section on the line II—II, Fig. 1, looking in the direction of the arrow; and Fig. 3 is a section on the line III—III, Fig. 2, looking in the direction of the arrow.

Cylinder 1 is shown as having piston therein provided with head 2 and skirt 3. Connected to this piston is connecting rod 4 from crank 5 which in operation dips into lubricant 6 in pan 7. The piston skirt 3 is shown as provided with grooves 8 for packing rings 9 and grooves 10, 11, for lubricant flow packing rings 12, 13. Between these lubricant flow packing rings 12, 13, the skirt of the piston is relieved or has reduced diameter portion 14. From this portion 14 there is shown extending a plurality of ports 15 inclined away from the head 2 to terminate in groove 16 on the inner side of the skirt 3. In this groove 16 is expansible ring 17 as a check valve. This ring 17 is held by pin 18 so that its split portion 19 may at all times be kept out of registry with the ports 15. From this groove 16, adjacent each of the ports 15 and therebelow, is a cut-away or drain-off portion 20.

In operation whether force feed or the lubricant 6 in the pan 7 is thrown up into the cylinder 1 to lubricate the cylinder, as such cylinder is effective either as a pump or as a motor. In either instance, the operation may be for suction or compression or both. There is accordingly a tendency for the lubricant, even in the vertical position of the cylinder 1, to work up past the piston and contaminate the material handled. While it is desirable to keep the skirt of the cylinder lubricated, it is not desired to have the lubricant in quantity get past the piston.

The lubricant retarding rings 12, 13, coact against such flow and such is supplemented by the ports 15. Each port coacting at the relief portion 14 has such as a provision for promoting accumulation of the lubricant to be drawn off or flow off by the ports 15. The ring 17 is normally in closed position for the ports, or approximately closed position. In the event there is not a pressure action through the ports, the drainage is effective past the ring through the drain-off portions 20 to thus relieve the cylinder of such lubricant from pumping action by the piston. Any tendency in the piston reciprocation tending to draw the lubricant for reverse flow through the ports 15 is at once checked by this check valve expansible ring 17 insuring a holding of the lubricant against supply through this source onto the cylinder walls. This is an effective expedient against oil pumping.

What is claimed and it is desired to secure by United States Letters Patent is:

1. A piston provided with a skirt having lubricant flow-off ports thereinto, and a common valve member extending past a plurality of the ports checking reverse flow outward.

2. A piston provided with a head and a skirt, there being ports through the skirt inclined away from the head, and a common valve member for a plurality of the ports at the remote portions of the ports from the head.

3. A piston provided with a head and skirt, there being ports through the skirt inclined inward away from the head, and an expansible check valve ring at the inner portions of said ports.

4. A piston provided with a head and a skirt, a pair of rings for the piston having a relieved portion therebetween, there being ports through the skirt from the relieved portion inclined inward away from the head, and a split ring expansible to close the ports remote from the relieved portion.

5. A piston provided with a skirt having external ring grooves, and an inner ring groove, said piston being relieved by a pair of said exterior ring grooves and ports between said relieved portion and the inner groove, drain portions from the inner groove adjacent the ports, and an expansible ring check valve in the inner groove for said ports.

In witness whereof I affix my signature.

DENT SANDFORD.